(12) United States Patent
Vippagunta

(10) Patent No.: US 9,876,743 B1
(45) Date of Patent: Jan. 23, 2018

(54) INTER-USER MESSAGE FORWARDING BY AN ONLINE SERVICE

(71) Applicant: Amazon Technologies, Inc., Seattle, WA (US)

(72) Inventor: Rajendra Kumar Vippagunta, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 427 days.

(21) Appl. No.: 14/634,524

(22) Filed: Feb. 27, 2015

(51) Int. Cl.
*G06F 15/16* (2006.01)
*H04L 12/58* (2006.01)
*H04L 29/06* (2006.01)

(52) U.S. Cl.
CPC ............ *H04L 51/14* (2013.01); *H04L 63/083* (2013.01)

(58) Field of Classification Search
CPC .............................. H04L 51/14; G06Q 10/107
USPC ......................................................... 709/206
See application file for complete search history.

(56) References Cited

U.S. PATENT DOCUMENTS

| | | | | |
|---|---|---|---|---|
| 2007/0078786 A1* | 4/2007 | Bous | ..................... | G06Q 20/383 705/74 |
| 2010/0268645 A1* | 10/2010 | Martino | ................. | G06Q 20/10 705/44 |
| 2011/0294481 A1* | 12/2011 | Nzumafo | ................. | H04L 51/36 455/417 |
| 2014/0006283 A1* | 1/2014 | Hogg | ..................... | G06Q 20/10 705/44 |
| 2014/0237608 A1* | 8/2014 | Prier | ....................... | H04L 51/28 726/26 |
| 2014/0379576 A1* | 12/2014 | Marx | ............... | G06Q 20/35785 705/44 |
| 2014/0379820 A1* | 12/2014 | Carson | ................ | H04L 61/3005 709/206 |
| 2015/0004946 A1* | 1/2015 | Schmidt | ................ | H04L 65/601 455/412.2 |

* cited by examiner

*Primary Examiner* — Hamza Algibhah
(74) *Attorney, Agent, or Firm* — Lee & Hayes, PLLC

(57) ABSTRACT

An online service may receive a request by a first user to provide a notice or other communication to a second user. The request may specify an email address or other communication address in order to identify the second user. The specified email address may be different than the primary email address by which the second user is known to the online service. Upon receiving such a request, the online service emails the second user using the specified email address and asks the second user to log on to the online service. When the second user logs on, the online service adds the specified email address to the account information of the second user as a secondary email address. When a subsequent request specifies the secondary email address, the notice is sent instead to the primary email address of the second user.

20 Claims, 4 Drawing Sheets

US 9,876,743 B1

INTER-USER MESSAGE FORWARDING BY AN ONLINE SERVICE

BACKGROUND

People are increasingly interconnected by asynchronous electronic communications channels such as email, SMS texting, chat, group messaging, and so forth. Any single person may use any number of these media. Furthermore, a person may have several different communication addresses, even for a particular communication channel. For example, a person may have several different email addresses that are used for different types of communications: one email address for personal communications, another email address for work-related communications, and another email address for online commerce.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
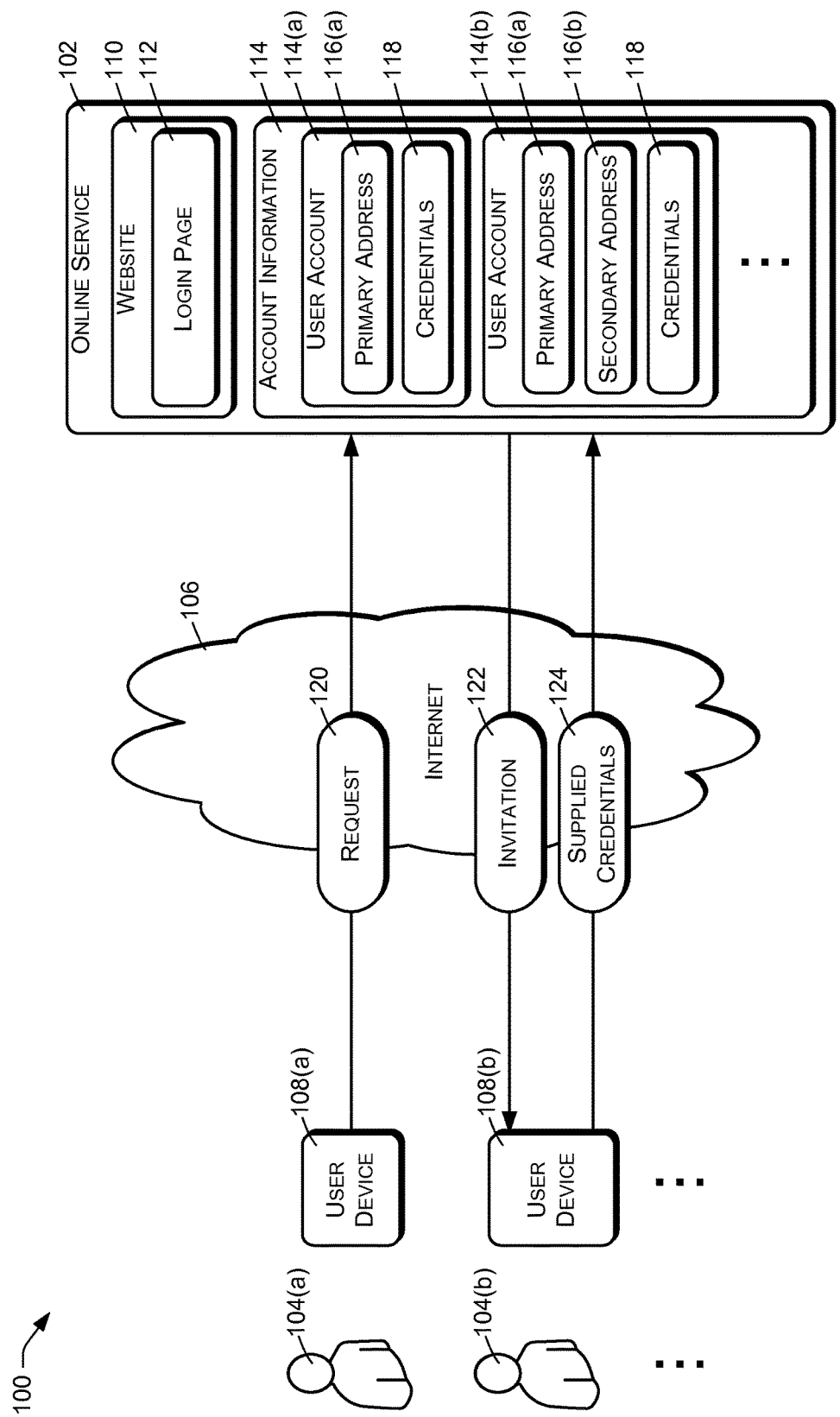
FIG. 1 is a block diagram illustrating communications between an online service and users of the online service.

An Internet-based electronic commerce site may maintain accounts for many different users. The account of an individual user may be associated with stored account information such as a name, a physical address, an email address, credit card information, preferences, and other information. When a user places an order for goods or services through the commerce site, the stored account information may be used rather than requiring the user to manually enter the information for every order.

In certain situations a first user of an online service may request that services, goods, or communications be provided by the online service to a second user of the online service. For example, the first user may purchase a gift certificate or other item for the second user. As another example, the first user may request the online service to add the second user to a group of users for sharing certain types of information. In order to communicate with the second user, the online service may ask the first user to supply a communication address of the second user, such as an email address or a telephone number to which a text message may be sent.

The online service may send an email or text message to the second user, using the supplied communication address. The email or text message may contain a link to a login portal of the online service. At the login portal, the second user is asked to enter login credentials such as a user name and a password. Once the second user has provided login credentials, the online service is able to identify the second user and access his or her account information.

The account information of the second user may indicate a different communication address than the one supplied by the first user. For example, the first user may have supplied an email address that the second user typically uses for personal communications, while the email address indicated by the second user's account information may be one that the second user uses for online commerce.

With the permission of the second user, the online service may add the communication address supplied by the first user as a secondary address for the second user while the communication address previously known to the online service remains classified as a primary address. Upon receiving future requests that specify the secondary address, the online service may instead send messages to the second user using the primary address of the second user.

As a more specific example, suppose that first and second users have respective accounts with an online retail service. The online retail service has implemented a social networking system among its users, allowing friends or users with similar interests to communicate with each other and to collaborate with respect to purchasing decisions. For example, the retail service may allow the users to form user groups, where the members of an individual group share information such as purchase information and product reviews.

An existing member of the user group may invite other users of the online service to join the group. In order for a first user to invite a second user to join a group, the first user may request that the retail service send an invitation to the second user. The first user may supply an email address of the second user so that the retail service can communicate with the second user.

The online service receives the email address supplied by the first user and sends an invitation to the second user using the supplied email address. The invitation contains a link to the website of the online service. Upon receiving the invitation, the second user selects the link and is directed to a login portal or page of the online service. The second user provides login information such as a user name and a password. The online service authenticates the second user based on this information and locates the account information of the second user.

The account information of the second user may indicate a primary email address that the second user has specified for online commerce activities. The primary email address may be different than the email address supplied by the first user. However, upon receiving permission from the second user, the online service stores the email address supplied by the first user as a secondary email address.

In the future, the shopping service may receive additional requests to send invitations to the second user, where the additional requests indicate the secondary email address. Upon receiving a request such as this, the retail service may instead send an invitation to the primary email address of the second user. This allows the second user to consistently receive communications at a single email address, even when other users identify the user by other email addresses.

FIG. 1 shows an example environment 100 in which these techniques may be implemented. A network-based, online service 102 is accessible to multiple users 104 through a public, wide-area network 106 such as the Internet. Each user 104 accesses the online service 102 through a user device 108, which may comprise a desktop computer, a laptop computer, a smartphone, a tablet computer, or any of device capable of communicating with the online service 102.

In some cases, the online service 102 may implement a website 110 that is accessible through an Internet address known as a uniform resource locator (URL). The website 110 may include multiple pages of graphic elements that present information and that receive instructions and information from a user. The pages may include a login page 112 that the users 104 access through the user devices 108 to log in to user accounts.

Interaction with the users 104 may be performed by means of the pages of the online service's website 110. In some cases, each user 104 may utilize a browser component or application that is executed by the user device 108 to navigate among the pages of the website 110 and to input information into controls presented on the pages of the website 110.

In certain cases, the online service 102 may provide services through the use of dedicated applications that are executed by the user devices 108 and that communicate with the online service 102 using application programming interfaces (APIs) of the online service 102.

The website 110 may be used to provide services of various types. As one example, the website 110 may be used for selling goods or services. As another example, the website 110 may be used for publishing content such as news, commentary, discussion, stories, music, movies, pictures, etc. As yet another example, the website 110 may comprise or may include a web log, also referred to as a blog. As yet another example, the website 110 may comprise a social sharing service, also known as a social networking site that allows users to communicate and share various types of information or media with each other. As yet another example, the website 110 may provide digital media content such as music, movies, or books on a subscription or pay-per-use basis.

A particular website 110 may incorporate more than one of these different types of services. For example, a commerce site, used for selling products, may also implement social networking features. Such social networking features may allow users of the commerce site to form groups of users who share various types of information such as product preferences, reviews, comments, purchase histories, product wish lists, gift registries, and so forth.

The online service 102 maintains an account for each of the users 104. A user 104 may establish an account by accessing the website 110 and registering with the online service 102. Registration may include providing certain information that is stored by the online service 102 as account information 114. The account information 114 for an individual user 104 may include the name of the user, the billing address of the address, the shipping address of the user, credit card information of the user, communication preferences of the user, logs of previous user activities, and so forth. FIG. 1 illustrates account information 114(a) and 114(b) associated with accounts of first and second users 104(a) and 104(b), respectively.

Most relevant to the present discussion, the account information 114 for each user includes one or more communication addresses 116. A communication address may comprise an email address, a telephone number used for SMS (short message service) text messaging, or one of various other types of identifiers that may be used with different types of messaging services to direct communications to a particular person or entity.

In some embodiments, communication addresses may comprise user names or identifiers used with different types of messaging services such as social networking services, group messaging services, and so forth. Communication addresses may include user IDs, user names, user handles, user numbers (e.g., telephone numbers or social security numbers), etc. Generally, a communication address is a string or other token that is used by a communication service to uniquely identify a user of the service.

In the described embodiment, the account information 114 includes at least a primary communication address 116(a). The account information 114 for some users may also include a secondary communication address 116(b). In FIG. 1, the first user account 114(a) is shown as having only a primary communication address 116(a). The second user account 114(b) is shown as having both a primary communication address 116(a) and a secondary communication address 116(b). Note that in some cases, one of the primary and secondary communication addresses may comprise an email address and the other of the primary and secondary communication addresses may comprise a telephone number. More generally, one of the primary and secondary communication addresses may be for use with a first messaging service and the other of the primary and secondary communication addresses may be for use with a second message service. Messaging services may include direct communication services such as email and SMS (short text messaging), as well as group messaging services, social networking services, and various other types of message services that may use different types of communication techniques.

The account information 114 for an individual user may also include user credentials 118, which may as an example comprise a user identifier and an associated password. When accessing the website 110 of the online service 102, the user 104 may be asked to log in to the service by providing his or her credentials in the login page 112. Upon receiving the user credentials, the online service 102 searches its stored account information 114 to determine whether the supplied credentials match the credentials 118 of any registered user. In certain embodiments, the user credentials 118 may be encrypted or otherwise tokenized for storing and processing.

There may be certain situations in which a first user 104(a) needs to identify a second user 104(b) to the online service 102. For example, the first user 104(a) may want the online service 102 to invite the second user 104(b) to join a user group in which information regarding individual members of the group is shared among the members. As another example, the first user 104(a) may purchase a gift or a gift certificate for the second user 104(b) through the website 110 and the online service 102 may need to communicate with the second user 104(b) in order to associate the gift or gift certificate with the account of the second user 104(b). A gift or gift certificate may in some cases comprise or be for a digital product such as an electronic book, which may be delivered through an existing account of the second user 104(b).

By interacting with the website 110, the first user 104(a) may generate a request 120 for the online service 102 to communicate with the second user 104(b). In order to identify the second user 104(b) to the online service 102, and in order to provide a way for the online service 102 to communicate with the second user 104(b), the first user 104(a) may supply a communication address of the second user 104(b). The communication address of the second user 104(b) as provided by the first user 104(a) will be referred to herein as the supplied communication address. The supplied communication address may be included as part of the request 120.

Upon receiving the request 120, the online service 102 generates an invitation or other message 122 and sends it to the second user 104(*b*). The invitation may contain a reference to the website 110 of the online service 102 such as an HTML (hypertext markup language) hyperlink to the URL of the website. In some cases, selecting or following the hyperlink may direct the second user 104(*b*) to a service login portal such as the login page 112 of the website, where the user is asked to enter their login credentials for authentication. Credentials entered by the second user 104(*b*) are shown in FIG. 1 as supplied credentials 124.

Upon being authenticated based on the supplied credentials 124, the second user 104(*b*) may then be directed to other pages of the website 110, such as pages allowing the second user 104(*b*) to respond to the communication from the online service 102. For example, the second user 104(*b*) may be presented with options for joining a user group or may be given the opportunity to claim or redeem a gift or gift certificate that has been provide by the first user 104(*a*).

When sending the invitation 122 to the second user 104(*b*), the online service 102 preferentially uses the primary communication address 116(*a*) of the second user 104(*b*), even when the supplied communication address specified by the first user 104(*a*) is different than the primary communication address. As an example, when the supplied communication address is the same as the secondary communication address 116(*b*) of the second user 104(*b*), the online service sends the communication to the primary communication address 116(*a*) rather than to the secondary communication address 116(*b*).

More generally, upon receiving the request 120 to communicate with the user 104(*b*), where the request 120 identifies the user 104(*b*) by a supplied communication address, the online service 102 searches its stored account information to determine whether any existing user's account information indicates the supplied communication address as either a primary communication address or a secondary communication address. If so, the communication is sent to the corresponding user using the primary communication address of that user, even if the supplied communication address was the secondary communication address of the user.

In some situations, the supplied communication address may not correspond to either the primary communication address or the secondary communication address of any registered user of the online service 102. In some cases, this may be because the account information 114 of the second user 104(*b*) does not yet include a secondary communication address 116(*b*). In other cases, this may be because the supplied address is an address other than the primary or secondary communication address of the second user 104(*b*). For example, the supplied address may be a third address of the second user 104(*b*). In these cases, the online service 102 sends the communication to the second user 104(*b*) using the supplied address.

Figure 2:
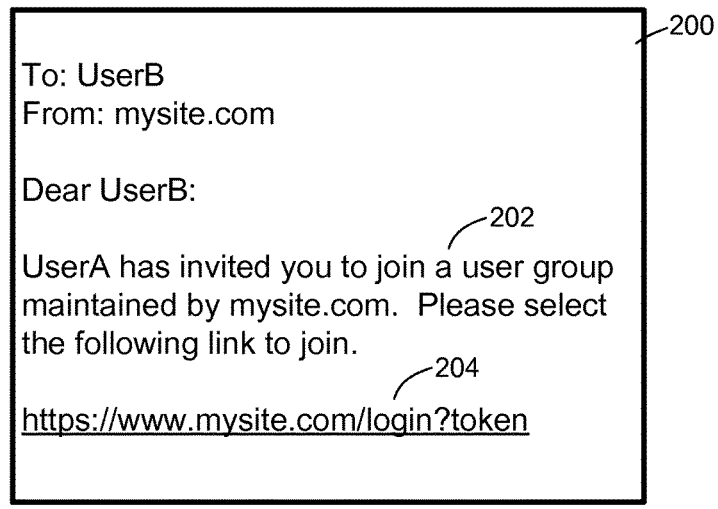
FIG. 2 shows an example of an invitation that may be sent to a user in response to a request by another user.

FIG. 2 shows an example of a communication 200 that may be sent by the online service 102 to the second user 104(*b*) in response to a request by the first user 104(*a*). In this example, the communication 200 comprises an email message containing descriptive text 202 indicating that a second user, referred to as UserB, has been invited by the first user, referred to as UserA, to join a user group maintained by the online service "mysite.com". The email message also contains a reference 204 to the website of the online service 102. The reference 204 comprises an HTML hyperlink that can be selected by the second user 104(*b*) to open the login page 112 of the online service 102. The hyperlink may comprise or may include a URL (uniform resource locator), which corresponds to an address of the website 110. The hyperlink may include a parameter indicating a code or token corresponding to the invitation 122 and/or to the request 120, which is passed to the website 110 when the second user 104(*b*) follows the hyperlink. In this example, the token follows the question mark that is embedded in the hyperlink after the URL. The token allows the website 110 to identify information relating to the original request 120 by the first user 104(*a*) such as a user identification of the first user 104(*a*), the communication address to which the invitation 200 was sent, and the nature of the communication.

The reference 204 may lead to the login page 112 of the website 110, which solicits the second user's credentials. The online service 102 receives the supplied credentials 124 and identifies the second user 104(*b*) based on the supplied credentials 124. If the communication address to which the invitation 122 was sent is not already specified as a primary or secondary communication address of the second user 104(*b*), the online service 102 adds the supplied address as a secondary communication address 116(*b*) of the second user 104(*b*). In the future, when further requests 120 for communications with the second user 104(*b*) indicate a secondary communication address 116(*b*) of the second user 104(*b*), the communications will be instead sent to the primary communication address 116(*a*) of the second user 104(*b*). Note that multiple secondary communication addresses 116(*b*) may be associated with a single user 104.

Figure 3:
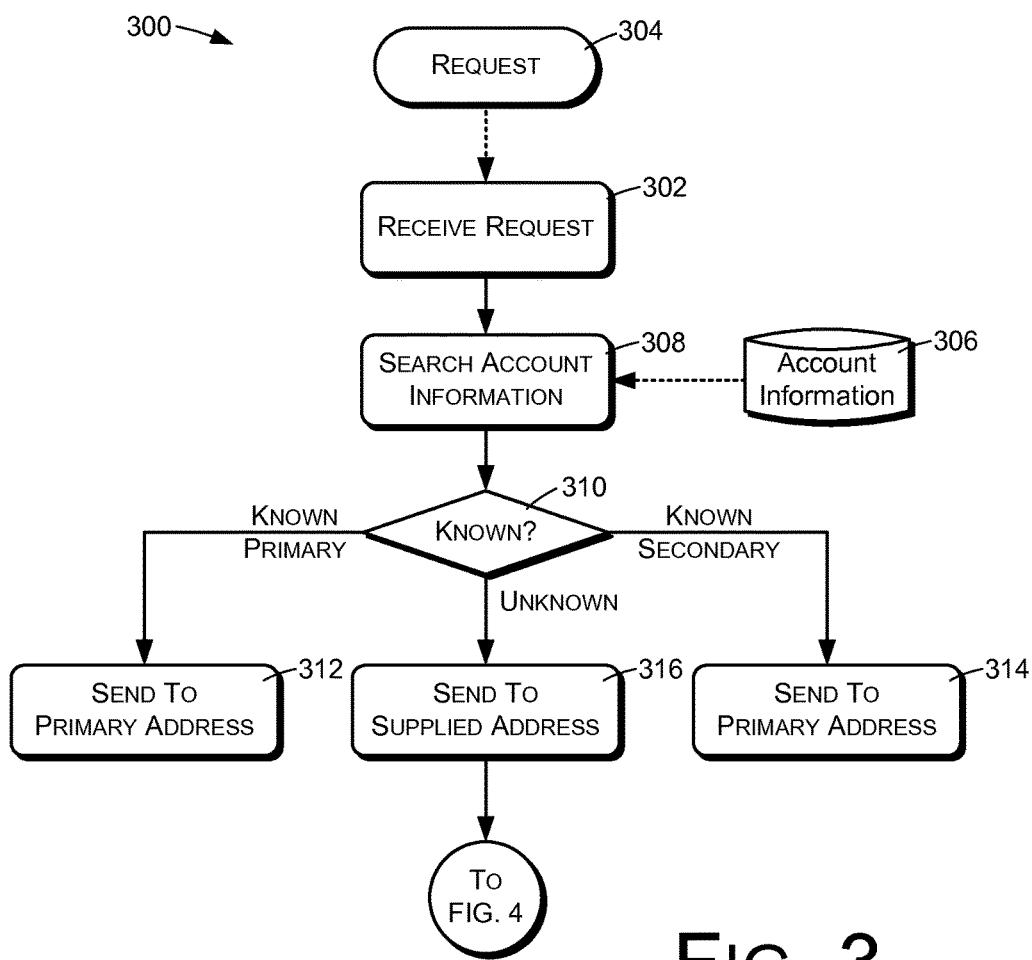
FIGS. 3 and 4 are flow diagrams illustrating an example method of forwarding communications based on primary and secondary communication addresses associated with a user.

FIG. 3 illustrates an example method 300 that may be performed by an online service such as a social networking service, a shopping service, a communications service, or any of various other types of online services that have multiple users. The example method 300 may be used when generating a communication to one user based on a request by another user. For purposes of discussion, the user who requests the communication will be referred to as an initiating user. The user who is to receive the communication will be referred to as a designated user. The initiating user may alternatively be referred to in some situations as the inviting user. The designated user may alternatively be referred to in some situations as the invited user or as the invitee.

An action 302 comprises receiving a request 304 from an initiating user to send or provide an invitation, message, or other communication to a designated user. The request specifies a communication address of the designated user, such as an email address, telephone number to which text messages may be sent, or other destination identifier. The communication address of the designated user provided by the initiating user will be referred to in the following discussion as the supplied communication address.

In this example, the initiating user and the designated user are both users of the online service and have respective accounts with the online service. The online service has account information 306 for each user as described above with reference to FIG. 1.

In the described embodiment, the request 304 may be generated as a result of interacting with the initiating user through a website. For example, the initiating user may access the website and navigate to a page that allows the initiating user to invite people to join a user group. As another example, the initiating user may access the website and purchase a product for the designated user and may instruct the website to send a communication to the designated user notifying the designated user of the purchase. The website may solicit information regarding the designated user, including the communication address of the designated user, so that the online service can send an invitation to each designated user.

An action 308 comprises searching the account information 306 stored by the online service to determine whether or not the supplied communication address is known to the online service. For example, the action 308 may comprise searching the account information of all users of the online service to determine whether the supplied communication address is associated with a user of the online service as either a primary communication address or a secondary communication address.

A decision block 310 determines which further actions are performed, based on the result of the action 308. If the supplied communication address is the primary communication address of a registered user, an action 312 is performed of sending the communication to the registered user using the primary communication address of the registered user. If the supplied communication address is the secondary communication address of a registered user, an action 314 is performed of sending the communication to the registered user using the primary communication address of the registered user, rather than using the secondary communication address of the registered user. If the supplied communication address is unknown and does not correspond to the primary or secondary communication address of any known user of the online service, an action 316 is performed of sending the communication to the designated user using the supplied communication address. After performing the action 316, the method illustrated by FIG. 4 is performed.

Figures 4, 5:
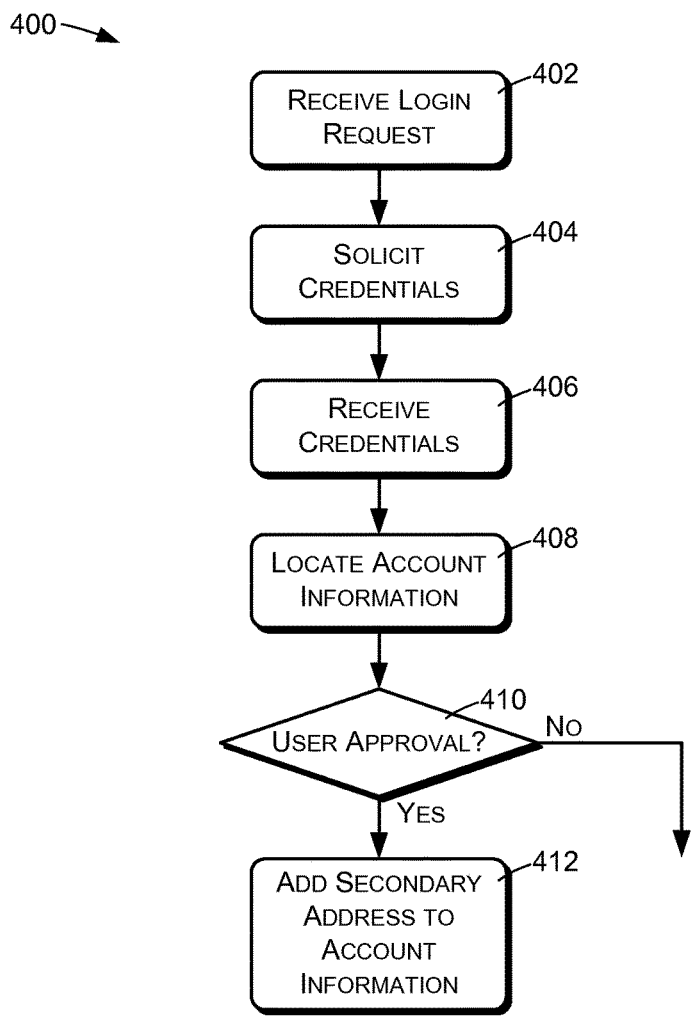
FIG. 5 illustrates an example structure of a database table that may be maintained to associate primary and secondary communication addresses with users of the online service.

FIG. 4 illustrates an example method 400 that may be performed when the online service receives a supplied communication address that does not correspond to either the primary communication address or the secondary communication address of any user of the online service. As described with reference to FIG. 2, the communication sent to the designated user contains a reference to the website of the online service in the form of a hyperlink and/or URL that the designated user can select in order to access the login page of the website. An action 402 comprises receiving a request to login to the website, such as by receiving an HTML request for the login page or other service login portal, based on the URL that is referenced in the communication to the designated user. An action 404 comprises providing or presenting the login page to the designated user in response to receiving the request, and soliciting login credentials of the designated user.

An action 406 comprises receiving the credentials of the designated user as a result of interacting with and authenticating the user through the login page of the website of the online service. The credentials may comprise a user identifier, which may comprise a user name, an email address, or any other identifier. The credentials may also comprise one or more security factors such as a password.

An action 408 comprises locating and/or identifying account information associated with the user identification provided by the designated user during the login. This may comprise searching a database of account information to locate a user account of the designated user. The account information for a particular user may indicate a primary communication address of the user and may in some cases also indicate a second communication address of the user.

FIG. 5 shows an example of a database structure that may be used to store user account information. The database structure may comprise a table 500 having columns for user identification (user ID), primary communication address, secondary communication address, and other information. The table 500 may be indexed by the user ID column, by the primary communication address column, and/or by the secondary communication address column. In order to locate account information based on a user identification provided during a login process, the table 500 is searched by the user ID column. A user account may also be located based on a primary or secondary communication address of a user.

Returning to FIG. 4, an action 410 comprises obtaining or receiving permission from the designated user for adding the supplied communication address to the account information of the designated user. For example, the website of the online service may display a prompt that asks the user whether future communications to the supplied address should be sent instead to the primary address of the user. If the user does not indicate his or her approval, no further action is taken. If the user indicates approval, an action 412 is performed.

The action 412, which assumes that the user has given approval in the action 410, comprises associating the supplied communication address with the primary communication address of the user as a secondary communication address, such as by associating the supplied communication address with the account information of the user. For example, the supplied communication address may be added to and stored in the table 500 as a secondary communication address of the designated user.

At a later time, the online service may receive another request to invite the user to another user group, where this request specifies the designated communication address, which has now been stored as a secondary communication address of the user. In response, the online service locates the account information of the user based on the supplied email address and determines the primary email address of the user based on the account information of the user, all as described above with reference to FIG. 3. The online service then sends an invitation for the user to join the second user group using the primary communication address rather than the supplied communication address.

As a specific example of communications in accordance with the methods of FIGS. 3 and 4, an online service may receive a first request to invite a designated user to a first user group. The first request may specify a supplied email address of the designated user that is not known to the online service. Specifically, the supplied email address is not known to be a primary or secondary communication address of any user of the online service.

In response to receiving the request, the online service may email a first invitation to the designated user using the supplied email address. The first invitation contains text inviting the user to join the first user group as well as a URL of a login page for the online service. In response to the user selecting the URL, the online service receives a request for its login page and provides the login page in order to solicit and receive login credentials of the user. The online service then locates account information of the user based on the login credentials. The account information is assumed to indicate a primary communication address of the user.

Upon locating the account information of the user, the online service obtains approval of the user to associate the supplied email address with the user. The online service may also obtain approval from the user for emailing future invitations to the primary communication address rather than the secondary communication address, even in situations where requests are received that specify the secondary communication address. Upon receiving such approval, the online service adds the supplied email address as a secondary communication address to the account information of the user. Subsequent requests that specify the secondary communication address result in communications being sent to the primary communications address rather than the secondary communication address.

Figure 6:
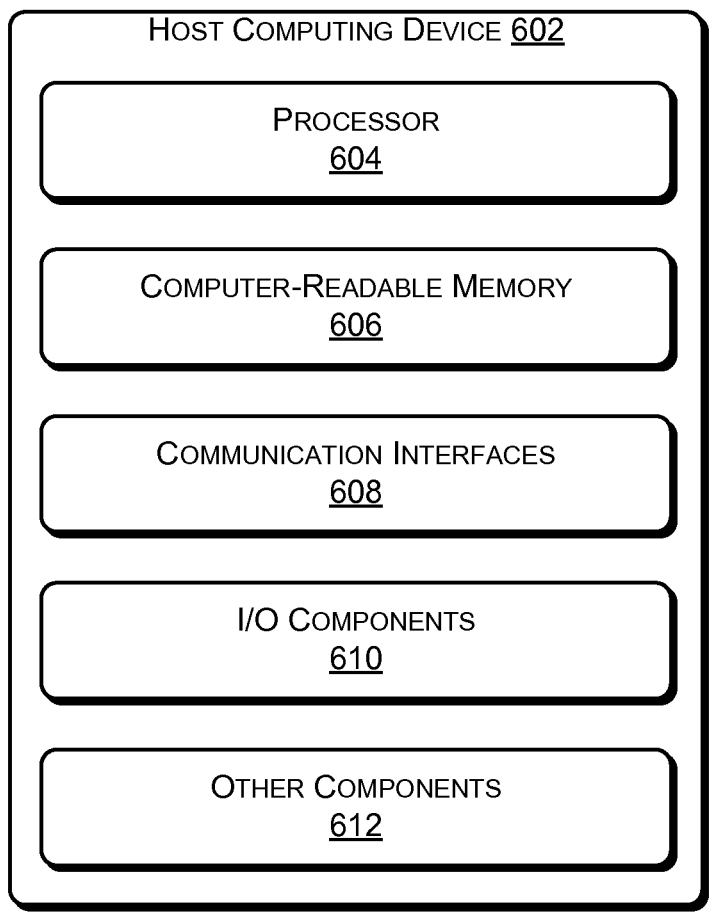
FIG. 6 is a block diagram showing relevant functional components of a base device.

FIG. 6 illustrates select components of an example server, computer, or host computing device 602, one or more of which may be configured to implement an online service and to perform the techniques described herein. The example host computing device 602 includes one or more processors 604, computer-readable media 606, and one or more communication interfaces 608. The processor(s) 604 may comprise a single processing unit or a number of processing units, and may include single or multiple computing units or multiple cores. The processor(s) 604 can be configured to fetch and execute computer-readable instructions stored in the computer-readable media 606 or other computer-readable media.

The computer-readable media 606 may include volatile and nonvolatile memory and/or removable and non-removable media implemented in any type of technology for storage of information, such as computer-readable instructions, data structures, program modules, or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 602, the computer-readable media 606 may be a type of computer-readable storage media and may be a non-transitory storage media.

The computer-readable media 606 may be used to store any number of functional components that are executable by the processors 604. In many implementations, these functional components comprise instructions or programs that are executable by the processors 604 and that, when executed, implement operational logic for performing the actions described above. The computer- readable media 606 may also be used for the account information described herein.

The host computing device 602 may include communication interface(s) 608, which may include one or more interfaces and hardware components for enabling communication with various other devices, such as the user devices 108, over a wide-area network such as the Internet.

The host computing device(s) 602 may further be equipped with various input/output components 610. Such I/O components 610 may include a display, various user interface controls (e.g., buttons, mouse, keyboard, touch screen, etc.), audio speakers, connection ports and so forth.

The host computing device(s) 602 may also include many other logical, programmatic, and physical components 612, of which those described above are merely examples that are related to the discussion herein.

The various processes and techniques described herein may be implemented at least in part by software, comprising instructions that are stored or maintained by the computer-readable memory of the user devices 108, the host computing device 602, and/or of any other device, or by independent computer-readable memory that is used for storing and transferring the software.

This disclosure provides various example implementations, as described and as illustrated in the drawings. However, this disclosure is not limited to the implementations described and illustrated herein, but can extend to other implementations. The example methods or processes described herein are only examples of methods or processes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

What is claimed is:

1. A system comprising:
a processor; and
one or more non-transitory computer-readable media storing computer-executable instructions that, when executed on the one or more processors, cause the one or more processors to perform actions comprising:
receiving a first request to invite a user to a first user group, wherein the first request supplies an email address of the user;
emailing a first invitation to the user using the email address supplied by the first request, the first invitation containing a uniform resource locator (URL) of a login page;
receiving a request for the login page based at least in part on the URL from the first invitation;
providing, based at least in part on receiving the request for the login page, the login page, wherein the login page solicits login credentials of the user;
receiving the login credentials of the user;
locating account information of the user based at least in part on the received login credentials, wherein the account information indicates a primary email address of the user;
adding the supplied email address to the account information of the user as a secondary email address of the user;
receiving a second request to invite the user to a second user group, wherein the second request specifies the secondary email address of the user;
locating the account information of the user based at least in part on the secondary email address;
retrieving the primary email address of the user from the account information; and
emailing a second invitation to the user at the primary email address.

2. The system of claim 1, the actions further comprising receiving permission from the user to add the supplied email address to the account information as the secondary email address.

3. The system of claim 1, the actions further comprising receiving permission from the user to email future invitations to the primary email address.

4. A method comprising:
receiving a first request to provide a first invitation to a user of a network-based service, the first request specifying a first communication address of the user;
sending, using the first communication address, the first invitation to the user, the first invitation containing a reference to a service login portal;
obtaining, via the service login portal, a user identifier associated with the user;

retrieving, based at least in part on the user identifier, account information identifying at least a second communication address of the user;

associating the first communication address with the second communication address;

receiving a second request to provide a second invitation to the user, the second request specifying the first communication address;

identifying the second communication address with which the first communication address is associated; and sending, using the second communication address, the second invitation to the user.

5. The method of claim 4, further comprising receiving permission from the user to associate the first communication address with the second communication address.

6. The method of claim 4, further comprising receiving permission from the user to send the second invitation using the second communication address.

7. The method of claim 4, wherein the service login portal authenticates the user.

8. The method of claim 4, wherein the first communication address comprises a telephone number.

9. The method of claim 4, wherein the first communication address comprises an email address.

10. The method of claim 4, wherein one of the first or second communication addresses is for use with a first messaging service and another of the first or second communication addresses is for use with a second messaging service.

11. The method of claim 4, wherein one of the first or second communication addresses comprises an email address and another of the first or second communication addresses comprises a telephone number.

12. A method comprising:

receiving a first request to provide a first communication to a person, the first request specifying a first communication address of the person;

sending, via the first communication address, the first communication to the person;

obtaining an identification of the person;

determining, based at least in part on the identification of the person, a second communication address of the person;

associating the first communication address with the second communication address;

receiving a second request to provide a second communication to the person, the second request specifying the first communication address of the person;

determining, based at least in part on the second communication being associated with the first communication address, the second communication address of the person; and sending, via the second communication address, the second communication to the person.

13. The method of claim 12, further comprising receiving approval from the person to associate the second communication address with the first communication address.

14. The method of claim 12, further comprising receiving approval from the person to send future communications using the second communication address.

15. The method of claim 12, wherein the first communication contains a reference to a service login portal.

16. The method of claim 12, wherein obtaining the identification comprises requesting a user identifier and a password.

17. The method of claim 12, wherein obtaining the identification comprises requesting login information from the person.

18. The method of claim 12, wherein determining the second communication address comprises accessing account information associated with the person.

19. The method of claim 12, wherein the first communication address comprises an email address.

20. The method of claim 12, wherein one of the first or second communication addresses is for use with a first messaging service and another of the first or second communication addresses is for use with a second messaging service.

\* \* \* \* \*